United States Patent
Bansleben et al.

(10) Patent No.: US 6,255,248 B1
(45) Date of Patent: *Jul. 3, 2001

(54) OXYGEN SCAVENGING COMPOSITION WITH IMPROVED PROPERTIES AND METHOD OF USING SAME

(75) Inventors: Donald A. Bansleben, Columbia, MD (US); Slawomir Opuszko, Duncan; Drew V. Speer, Simpsonville, both of SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

This patent is subject to a terminal disclaimer.

(21) Appl. No.: 09/350,336

(22) Filed: Jul. 9, 1999

(51) Int. Cl.$^7$ .............................. B01J 31/06; C08F 32/00; B65D 3/00
(52) U.S. Cl. .................. 502/159; 526/308; 526/348; 252/188.28; 252/397; 428/35.7; 428/35.8; 428/35.9; 428/349; 428/516; 428/35.2; 428/35.3
(58) Field of Search ................ 502/159; 526/308, 526/348; 252/188.28, 397; 428/35.7, 35.8, 35.9, 349, 516, 35.2, 35.3

(56) References Cited

U.S. PATENT DOCUMENTS

| | | |
|---|---|---|
| 5,087,677 | 2/1992 | Brekner et al. .................. 526/160 |
| 5,350,622 | 9/1994 | Speer et al. ...................... 428/215 |
| 5,425,896 | 6/1995 | Speer et al. . |
| 5,529,833 | 6/1996 | Speer et al. ...................... 428/215 |
| 5,636,573 | 6/1997 | Harrington et al. .............. 526/170 |
| 5,834,079 | * 11/1998 | Blinka et al. .................... 428/35.7 |
| 5,942,297 | * 8/1999 | Speer et al. ..................... 428/35.4 |
| 5,981,676 | * 11/1999 | Gauthier et al. ................. 526/308 |
| 6,034,259 | 3/2000 | Brookhart et al. ............... 556/137 |

FOREIGN PATENT DOCUMENTS

| | | |
|---|---|---|
| 0 854 1662 A2 | 9/1993 | (EP) . |
| WO 94/07944 | 4/1994 | (WO) . |
| WO 97/07161 | 2/1997 | (WO) . |
| WO 97/44364 | 11/1997 | (WO) . |
| WO 98/05555 | 2/1998 | (WO) . |
| WO 98/05703 | 2/1998 | (WO) . |
| WO 98/51758 | 11/1998 | (WO) . |
| WO 98/51759 | 11/1998 | (WO) . |
| WO 99/16824 | 4/1999 | (WO) . |

OTHER PUBLICATIONS

Nuclear Magnetic Resonance Evidence for a New Microstructure in Ethene–Cyclopentene Copolymers, Macromolecules 1995, 28, pp 7095–7099, Alexej Jerschow et al. No month available.

Copolymerization of cycloalkenes with ethylene in presence of chiral zirconocene catalysts, Makromol. Chem. 190, 1989, pp. 515–526, Walter Kaminsky, Regina Spiehl. No month available.

New polymers by metallocene catalysis, Macromol. Chem. Phys. 197, 1996, pp. 3907–3945, Walter Kaminsky. No month available.

* cited by examiner

*Primary Examiner*—Elizabeth D. Wood
(74) *Attorney, Agent, or Firm*—Mark B. Quatt

(57) ABSTRACT

A composition capable of scavenging oxygen composed of (i) a copolymer of, at least, ethylene and a strained, cyclic alkylene, preferably cyclopentene; (ii) a transition metal catalyst; (iii) preferably, a photoinitiator; and (iv) optionally, a polymeric diluent.

26 Claims, No Drawings

OXYGEN SCAVENGING COMPOSITION WITH IMPROVED PROPERTIES AND METHOD OF USING SAME

FIELD OF THE INVENTION

This invention relates to a composition useful in scavenging oxygen from environments containing oxygen-sensitive products, particularly food and beverage products. More specifically, the oxygen scavenging composition includes a polymer having mer units derived from a strained, cyclic alkylene compound, a transition metal compound and, optionally, a photoinitiator.

BACKGROUND OF THE INVENTION

Limiting the exposure of oxygen-sensitive products to oxygen maintains and enhances the quality and shelf life of many products. For instance, by limiting the oxygen exposure of oxygen-sensitive food products in a packaging system, the quality of the food product can be maintained and spoilage retarded. In addition, such packaging also keeps the product in inventory longer, thereby reducing costs incurred from waste and having to restock.

In the food packaging industry, several techniques for limiting oxygen exposure have been developed. Common techniques include those where oxygen is consumed within the packaging environment by some means other than the packaged article or the packaging material (e.g., through the use of oxygen scavenging sachets), those where reduced oxygen environments are created in the package (e.g., modified atmosphere packaging (MAP) and vacuum packaging), and those where oxygen is prevented from entering the packaging environment (e.g., barrier films).

Sachets containing oxygen scavenging compositions can contain ferrous compositions, which oxidize to their ferric state, unsaturated fatty acid salts on an absorbent, and/or a metal-polyamide complex. The disadvantages of sachets include the need for additional packaging steps (to add the sachet to the package), the potential for contamination of the packaged article should the sachet break, and the danger of ingestion by a consumer.

Oxygen scavenging materials also have been incorporated directly into the packaging structure. This technique (hereinafter referred to as "active oxygen barrier") can provide a uniform scavenging effect throughout the package and can provide a means of intercepting and scavenging oxygen as it passes through the walls of a package, thereby maintaining the lowest possible oxygen level throughout the package. Active oxygen barriers have been formed by incorporating inorganic powders and/or salts as part of the package. However, incorporation of such powders and/or salts can degrade the transparency and mechanical properties (e.g., tear strength) of the packaging material and can complicate processing, especially where thin films are desired. Also, these compounds as well as their oxidation products can be absorbed by food in the container, which can result in the food product failing to meet governmental standards for human consumption.

Oxygen scavenging compositions that include transition metal catalysts and ethylenically unsaturated hydrocarbon polymers which have an ethylenic double bond content of from 0.01 to 10 equivalents per 100 grams of polymer are known. However, because these polymers are amorphous, they can be difficult to blend and process with film-forming semicrystalline polymers conventionally used to make flexible packaging materials.

The use of a transition metal and a photoinitiator to facilitate initiation of effective scavenging activity of ethylenically unsaturated compounds is known. Because of the limited compatibility of the scavenger polymer with the film forming polymer, the amount of scavenger polymer in the blend must be limited and the resultant composition is difficult to process.

The use of a transition metal catalyst and a copolymer of ethylene and at least one vinyl unsaturated alicyclic monomer, preferably vinylcyclohexene, is known to provide excellent oxygen scavenging properties. However, prior to polymerization the vinylcyclohexene monomer is difficult to handle and has a strongly disagreeable odor.

Ideally, a polymeric material for use in an oxygen scavenging composition should exhibit good processing characteristics, be able to be formed directly into useful packaging materials or have high compatibility with those polymers commonly used to make packaging materials, and not produce byproducts which detract from the color, taste, or odor of the packaged product. Optimally, a packaging material formed from such a composition can retain its physical properties after significant oxygen scavenging.

SUMMARY OF THE INVENTION

Briefly, the present invention is directed to oxygen scavenger compositions comprising (i) a copolymer of, at least, ethylene and a strained, cyclic alkylene, preferably cyclopentene; (ii) a transition metal catalyst; (iii) optionally, a photoinitiator; and (iv) optionally, a polymeric diluent. This composition has been found to exhibit a high degree of processability, to be highly compatible with conventional polymers used in forming packaging materials, to exhibit significant ability to scavenge oxygen while part of a film or article used to package an oxygen sensitive product, and to produce insignificant amounts of organoleptic byproducts which can detract from the packaged product's odor, color, and/or taste.

In other aspects, the present invention provides an article which include at least one layer formed from a blend that includes the foregoing composition as well as a method of scavenging oxygen in which a packaging article, at least one layer of which is formed from a blend that includes the foregoing composition, is exposed to actinic or e-beam radiation so as to activate the composition.

The following definitions apply herein throughout unless a contrary intention is expressly indicated:

"polymer" means the polymerization product of one or more monomers and includes homopolymers, as well as copolymers;

"copolymer" means the polymerization product of two or more kinds of monomers;

"(meth)acrylate" means acrylate or methacrylate;

"photoinitiator" means a substance which, when activated by actinic radiation, enhances and/or facilitates the onset or initiation of one or more properties (e.g., oxygen scavenging) in another compound, thus resulting in a shorter induction period and/or an increase in the rate of oxygen uptake of the overall system;

"induction period" means the length of time beginning with the exposure to an actinic radiation and ending with the onset of one or more useful properties (e.g., oxygen scavenging); and "antioxidant" means a material which can inhibit oxidative degradation and/or crosslinking of a polymer so as to, for example, prolong the useful lifetime of the polymer; to stabilize a polymer-containing composition during processing (e.g., extrusion, coating, lamination, etc.); and/or to prolong the shelf-life of the composition (prior to exposure thereof to actinic or electron beam radiation).

DETAILED DESCRIPTION OF ILLUSTRATIVE EMBODIMENTS

The oxygen scavenging composition of the present invention includes one or more polymers that include mer units derived from a strained, cyclic alkylene, preferable cyclopentene. This polymer possesses sufficient crystallinity such that it is highly compatible with polymers conventionally used in the manufacture of packaging films and laminated structures (e.g., polyolefins and the like) and provides a composition which has good processing characteristics.

As is discussed above, most prior oxygen scavenging compounds have relied upon reaction of oxygen with a carbon-carbon double bond in an ethylenically unsaturated hydrocarbon of some type. The present invention differs from the prior art in that the mer units derived from a strained, cyclic alkylene do not present such a double bond. Instead, it is the strained configuration of the mer unit which allows for reaction with atmospheric oxygen. Ethylene/cyclopentene copolymers have been found to provide excellent oxygen scavenging properties without producing organoleptically significant by-products. Ethylene/cyclobutene copolymers are also within the scope of the present invention. Mer units derived from cyclohexene are not sufficiently strained to provide the desired reactivity during polymerization. Mer units derived from cyclopropylene are not considered to be sufficiently stable for commercial use. However, mer units derived from cycloheptene, cyclooctene and cyclononene are sufficiently strained (outwardly rather than inwardly as with cyclobutene and cyclopentene) to provide oxygen scavenging properties. Cyclic alkylenes having ten or more carbon atoms per ring are not within the scope of the present invention because they have sufficient degrees of freedom to twist into an essentially nonstrained conformation.

Optionally, the cyclic alkylene of the present polymeric component may include one or more substituent groups. Preferred substituents are $C_1$ to $C_{12}$ alkyl groups although other substituents may also be employed.

Also within the scope of the present invention is the combination of oxygen scavenging properties derived from the strained, cyclic alkylene mer units of the present polymeric component and oxygen scavenging properties derived from other sources. Such may be accomplished either by blending the present claimed polymeric component with one or more additional polymeric components having oxygen scavenging properties, as is discussed in greater detail below, or by providing additional mer units which provide oxygen scavenging properties in the present polymeric component. For example, providing the present polymeric component with mer units which present an ethylenically unsaturated carbon—carbon double bond provides a further, alternative site for oxygen reaction. The Examples set forth below demonstrate incorporation of vinylcyclohexene mer units into the present inventive polymeric component, although other mer units which provide oxygen scavenging properties may also be employed. Such mer units would be typically characterized as being non-conjugated dienes, for example, octadiene, hexadiene, dicyclopentadiene, ethylidene norbornene, vinyl norbornene and the like.

The polymeric component can be formed into a film or other suitable packaging material such as, for example, a bag or a pouch. It can be used as the sole polymeric material from which one or more layers of a film are formed (i.e., the film can be a multilayer film having, for example, a gas barrier layer, a seal layer, etc.), it can be blended with other polymeric oxygen scavenging agents (such as polybutadiene) or it can be blended with one or more diluent polymers which are known to be useful in the formation of packaging film materials and which often can render the resultant film more flexible and/or processable. Suitable diluent polymers include, but are not limited to, polyethylenes such as, for example, low density polyethylene, very low density polyethylene, ultra-low density polyethylene, high density polyethylene, and linear low density polyethylene; polyesters such as, for example, polyethylene terephthalate (PET); polyvinyl chloride (PVC); polyvinylidene chloride (PVDC); and ethylene copolymers such as ethylene/vinyl acetate copolymer, ethylene/alkyl (meth) acrylate copolymers, ethylene/(meth)acrylic acid copolymers, and ionomers. Blends of different diluent polymers also can be used.

Generally, the foregoing diluent polymers are semi-crystalline materials. Advantageously, the polymeric component of the composition of the present invention can be crystalline or semi-crystalline at ambient conditions and, accordingly, can be especially compatible with such diluent polymers. Selection of a particular diluent polymer(s) depends largely on the article to be manufactured and the end use thereof. For instance, certain polymers are known by the ordinarily skilled artisan to provide clarity, cleanliness, barrier properties, mechanical properties, and/or texture to the resultant article.

In combination with the polymeric component, the oxygen scavenging composition of the present invention includes a transition metal compound as a scavenger catalyst. The transition metal catalyst can be a salt which includes a metal selected from the first, second, or third transition series of the Periodic Table. The metal preferably is Rh, Ru, or one of the elements in the series of Sc to Cu (i.e., Sc, Ti, V, Cr, Mn, Fe, Co, Ni, and Cu), more preferably at least one of Mn, Fe, Co, Ni, and Cu, and most preferably Co. Suitable anions for such salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate. (The metal salt also can be an ionomer, in which case a polymeric counterion is employed.)

When used in forming a packaging article, the oxygen scavenging composition of the present invention can include only the above-described polymer and transition metal catalyst. However, photoinitiators can be added to further facilitate and control the initiation of oxygen scavenging properties. Adding a photoinitiator or a blend of photoinitiators to the oxygen scavenging composition can be preferred, especially where antioxidants have been added to prevent premature oxidation of the composition during processing and storage.

Suitable photoinitiators are known to those skilled in the art. See, e.g., PCT publication WO 97/07161, WO 97/44364, WO 98/51758, and WO 98/51759 the teachings of which are incorporated herein by reference as if set forth in full. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis (dimethylamino)benzophenone, acetophenone and its derivatives, such as, o-methoxy-acetophenone, 4'-methoxyacetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a]anthracene-7, 12-dione, 2,2-dimethoxy-2-phenylacetophenone, α,α-diethoxyacetophenone, α,α-dibutoxy- acetophenone, 4-benzoyl-4'-methyl(diphenyl sulfide) and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl] propanone] also can be used. However, photoinitiators are preferred because they generally provide faster and more efficient initiation. When actinic radiation is used, photoinitiators also can provide initiation at longer wavelengths which are less costly to generate and present less harmful side effects than shorter wavelengths.

When a photoinitiator is present, it can enhance and/or facilitate the initiation of oxygen scavenging by the composition of the present invention upon exposure to radiation. The optimal amount of photoinitiator to be used depends on the amount and type of mer units derived from strained, cyclic alkylenes present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which underneath another layer is somewhat opaque to the radiation used, more initiator might be needed. However, the amount of photoinitiator used for most applications ranges from about 0.01 to about 10% (by wt.) of the total composition. Oxygen scavenging can be initiated by exposing an article containing the composition of the present invention to actinic or electron beam radiation, as described below.

One or more antioxidants can be incorporated into the scavenging composition of the present invention to retard degradation of the components during compounding and film formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include 2,6-di(t-butyl)-4-methylphenol (BHT), 2,2'-methylene-bis(6-t-butyl-p-cresol), triphenylphosphite, tris(nonylphenyl)phosphite, dilaurylthiodipropionate, and the like.

When an antioxidant is included as part of the composition of the present invention, it preferably is present in an amount which prevents oxidation of the components of the oxygen scavenging composition as well as other materials present in a resultant blend during formation and processing; however, the amount preferably is less than that which interferes with the scavenging activity of the resultant layer, film, or article after initiation has occurred. The amount needed in a given composition can depend on the components present therein, the particular antioxidant used, the degree and amount of thermal processing used to form the shaped article, and the dosage and wavelength of radiation applied to initiate oxygen scavenging. Typically, such antioxidant(s) are used in an amount of from about 0.01 to about 1% (by wt.) of the total composition.

Other additives that also can be included in the oxygen scavenging composition of the present invention include, but are not necessarily limited to, fillers, pigments, dyestuffs, stabilizers, processing aids, plasticizers, fire retardants, anti-fog agents, antiblocking agents, and the like.

The amounts of the components used in the oxygen scavenging composition of the present invention can affect the use and effectiveness of this composition. Thus, the , amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction , period.

The composition of the present invention can provide oxygen scavenging properties at a desirable rate and capacity while having good processing and compatibility properties relative to compositions including conventional ethylenically unsaturated polymers. Thus, the present composition can be used to provide, by itself or as a blend with diluent film-forming polymers such as polyolefins and the like, a packaging material or film that can be manufactured and processed easily. Further, the subject oxygen scavenging composition is believed to consume and deplete the oxygen within a package cavity without substantially detracting from the color, taste, and/or odor of the product contained therein.

The amount of the polymeric component contained in the subject composition can range from about 1 to almost about 100%, preferably from about 5 to about 97.5%, more preferably from about 10 to 95%, even more preferably from about 15 to about 92.5%, still more preferably from about 20 to about 90%, (with all of the foregoing percentages being by weight) of the composition or layer made therefrom. Typically, the amount of transition metal catalyst can range from 0.001 to 1% (by wt.) of the scavenging composition, based on the metal content only (i.e., excluding ligands, counterions, etc.). Where one or more other scavenging compounds and/or diluent polymers are used as part of the composition, such other materials can make up as much as 99%, preferably up to about 75%, by weight of the scavenging composition. Any further additives employed normally do not make up more than 10%, preferably no more than about 5%, by weight of the scavenging composition.

The oxygen scavenging composition of the present invention can have enhanced properties not achievable by conventional scavenging compositions. The polymeric component can have a high content of strained, cyclic alkylene units (i.e., a high scavenging capacity). Films suitable for packaging applications can be formed directly from the polymer/transition metal composition. Further, the present composition can have a high content of polymeric scavenging component even when the composition contains a diluent polymer. As stated above, the polymer is highly compatible with known film forming polymers, such as polyolefins and in particular semi-crystalline polymers conventionally used in providing film packaging articles. Because of this high compatibility, the polymer and other diluent polymer can be readily blended in any ratio. In contrast, previously used amorphous ethylenically unsaturated polymers do not readily provide high content blends suitable for processing (e.g., extruded) into films and the like. The composition of the present invention can be processed (e.g., extruded) readily at high rates into films or film layers having desirable characteristics such as, for example, high clarity, reduced surface imperfections at high extrusion rates, and the like.

As indicated above, the composition of the present invention can be used to produce a scavenging monolayer film, a scavenging layer of a multilayer film, or other articles for a variety of packaging applications. Single layer articles can be prepared readily by extrusion processing. Multilayer films typically are prepared using coextrusion, coating, lamination or extrusion/lamination as taught in, for example, U.S. Pat. Nos. 5,350,622 and 5,529,833, the teachings of which are incorporated herein by reference. At least one of the additional layers of a multilayer article can include a material having a permeance to oxygen of no more than about $5.8 \times 10^{-8}$ $cm^3/m^2 \cdot s \cdot Pa$ (i.e., about 500 $cm^3/m^2 \cdot 24$ hours·atm) at about 25° C. Polymers which are commonly used in such oxygen barrier layers include poly(ethylene/vinyl alcohol), poly(vinyl alcohol), polyacrylonitrile, PVC, PVDC, PET, high barrier silicone or aluminum oxide layers (e.g., $SiO_x$), and polyamides such as nylon 6, MXD6, nylon 66, as well as various amide copolymers. (Metal foil layers can also provide oxygen barrier properties.) Other additional layers can include one or more layers which are permeable to oxygen. In one preferred packaging construction, especially flexible packages for food, the layers can include (in order starting from the outside of the package to the innermost layer of the package) (a) an oxygen barrier layer, (b) a scavenging layer, i.e. one that includes the scavenging composition described supra, and optionally, (c) an oxygen permeable layer. Control of the oxygen barrier property of layer (a) provides a means to regulate the scavenging life of the package by limiting the rate of oxygen entry to the scavenging layer (b), thus limiting the rate of consumption of scavenging capacity. Control of the oxygen permeability of layer (c) provides a means to set an upper limit on the rate of oxygen scavenging for the overall structure independent of the composition of scavenging layer (b). This can serve the purpose of extending the handling lifetime of the film in the presence of air prior to sealing of the package. Furthermore, layer (c) can provide a barrier to migration of the individual components or byproducts of the scavenging layer into the package interior. The term "exposed to the interior" refers to a portion of a packaging article having the subject scavenging composition which is either directly exposed or indirectly exposed (via layers which are $O_2$ permeable) to the interior cavity having oxygen sensitive product. Even further, layer (c) also can improve the heat sealability, clarity, and/or resistance to blocking of the multilayer film. Further additional layers such as tie layers also can be used. Polymers typically used in such tie layers include, for example, anhydride functional polyolefins.

The invention can be used to make various articles of manufacture, compounds, compositions of matter, coatings, etc. Two preferred forms are sealing compounds, and flexible films, both useful in packaging of food and non-food products.

It is known to use sealing compounds in the manufacture of gaskets for the rigid container market. Large, wide diameter gaskets are typically made using a liquid plastisol. This plastisol is a highly viscous, liquid suspension of polymer particles in a plasticizer. In the manufacture of metal or plastic caps, lids, and the like, this liquid plastisol is applied to the annulus of a container such as a jar, and the container with the applied plastisol is "fluxed" in an oven to solidify the plastisol into a gasket. The result is a gasket formed around the annulus of the container.

Smaller gaskets are typically made for use in beer crowns in bottles. A polymer melt is applied by cold molding to the entire inner surface of the crown. Both PVC and other polymers are used in this application.

Discs for plastic caps are typically made by taking a ribbon of gasket material and making discs, and inserting the discs into the plastic cap.

In all of these applications, the use of a strained, cyclic alkylene such as cyclopentene, and a transition metal catalyst, can beneficially provide removal of oxygen from the interior environment of the container, while controlling undesirable by-products of the oxygen scavenging reaction.

Thus, a gasket in accordance with the invention includes a polymeric composition, a strained, cyclic alkylene such as cyclopentene, and a transition metal catalyst. The gasket adheres a metal or plastic lid or closure to a rigid or semi-rigid container, thus sealing the lid or closure to the container.

Gasket compositions of the invention can be made by any conventional process, including, but not limited to, extrusion compounding for thermoplastic compositions, and conventional mixing equipment for plastisol compositions. The gasket compositions of the invention can then be formed into gaskets on lids by any conventional process, including but not limited to, cold molding processes, inserted discs, application of liquid plastisols via pressurized nozzles followed by solidification in an oven, etc.

The method of the present invention includes exposing the above-described composition to a package cavity having an oxygen sensitive product therein. A preferred embodiment provides for including a photoinitiator as part of the subject composition and subjecting a film, layer, or article that includes such a composition to radiation so as to initiate oxygen scavenging at desired rates. The radiation produced in heating and processing polymers typically used in packaging films (e.g., 100–250° C.) advantageously does not trigger oxygen scavenging.

The initiating radiation preferably is actinic, e.g., UV or visible light having a wavelength of from about 200 to about 750 mn, preferably of from about 200 to 600 nm, and most preferably from about 200 to 400 nm. The layer, film, etc., containing the oxygen scavenging composition preferably is exposed to such radiation until it receives at least about 1 J/g of radiation, more preferably until it receives a dose in the range of about 10 to about 2000 J/g. The radiation also can be e-beam radiation at a dosage of at least about 2 kiloGray (kG), preferably from about 10 to about 100 kG. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. For best uniformity of radiation, exposure preferably occurs at a processing stage where the layer or article is in the form of a flat sheet. For further information on initiation via irradiation, the reader is directed to PCT publications WO 98/05555 and WO 98/05703, the teachings of which are incorporated herein by reference.

Determining the oxygen scavenging rate and capacity of a given oxygen scavenging composition contemplated for a particular use can be beneficial. To determine the rate, the time elapsed before the scavenger depletes a certain amount of oxygen from a sealed container is measured. In some instances the rate can be determined adequately by placing a film containing the desired scavenging composition in an air-tight, sealed container of an oxygen containing atmosphere, e.g., air which typically contains 20.6% (by vol.) $O_2$. Over time, samples of the atmosphere inside the container are removed to determine the percentage of oxygen remaining. (Usually, the specific rates obtained vary under different temperature and atmospheric conditions. Atmospheres having lower initial oxygen content and/or maintained under low temperature conditions provide a more stringent test of the scavenging ability and rate of a composition. The rates which follow are at room temperature and one atmosphere of air, unless otherwise specified.) When an active oxygen barrier is needed, a useful scavenging rate can be as low as about 0.05 $cm^3$ oxygen per gram of the polymer in the scavenging composition per day in air at 25° C. and at 1 atm. However, in most instances, the present composition has a rate equal to or greater than about $5.8 \times 10^{-6}$ $cm^3/g \cdot s$ (0.5 $cm^3/g \cdot day$), even up to or greater than about $5.8 \times 10^{-5}$ $cm^3/g \cdot s$ (5 $cm^3/g \cdot day$). Further, films or layers including the subject composition are capable of a scavenging rate greater than about $1.2 \times 10^{-4}$ $cm^3/m^2 \cdot s$ (10 $cm^3/m^2 \cdot day$) and under some conditions, greater than about $2.9 \times 10^{-4}$ $cm^3/m^2 \cdot s$ (25 $cm^3/m^2 \cdot day$). (Generally, films or layers generally deemed suitable for use as an active oxygen barrier can have a scavenging rate as low as $1.2 \times 10^{-5}$ $cm^3/m^2 \cdot s$ (1 $cm^3/m^2 \cdot day$) when measured in air at 25° C. and 101 kPa (1 atm). Such rates make those layers suitable for scavenging oxygen from within a package, as well as suitable for active oxygen barrier applications.

When the method of the present invention is to be used in an active oxygen barrier application, the initiated oxygen scavenging activity, in combination with any oxygen barriers, preferably creates an overall oxygen permeance of less than about $1.1 \times 10^{-10}$ $cm^3/m^2 \cdot s \cdot Pa$ (1.0 $cm^3/m^2 \cdot day \cdot atm$) at 25° C. The oxygen scavenging capacity preferably is such that this value is not exceeded for at least two days.

Once scavenging has been initiated, the scavenging composition, layer, or article prepared therefrom preferably is able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 $cm^3/g$, but can be 50 $cm^3/g$ or higher. When such scavengers are in a layer of a film, the layer preferably has an oxygen capacity of at least about 9.8 $cm^3/m^2$ per $\mu m$ thickness (250 $cm^3/m^2$ per mil), more preferably at least about 47 $cm^3/m^2$ per $\mu m$ thickness (1200 $cm^3/m^2$ per mil).

The composition of the present invention has been found to be capable of providing a film, layer or article which substantially retains its physical properties (e.g., tensile strength and modulus) even after substantial oxygen scavenging has occurred. In addition, the present composition does not provide substantial amounts of byproduct and/or effluent, which can impart undesired taste, color, and/or odor to the packaged product.

Objects and advantages of this invention are further illustrated by the following examples. The particular materials and amounts thereof, as well as other conditions and details, recited in these examples should not be used to unduly limit this invention.

EXAMPLES

Procedure for Ethylene-Cyclopentene Copolymerization

Purification of the Reagents:

Anhydrous toluene (99.8%, Sigma-Aldrich) was transferred to a 5 gallon tank and degassed by sparging with argon and evacuation/fill cycles. Cyclopentene (96%, a Sigma-Aldrich) was purified by distillation from LiAlH4, and passed through neutral alumina (previously calcined at 300° C. for 4 hrs). Ethylene (Air Products, CP grade) was purified by passage through a column containing molecular sieves (3 Å, 4–8 mesh) and copper catalyst (BASF-R3-11). Racemic Ethylenebis(Indenyl)- Zirconium(IV)dichloride (rac-En(Ind)2ZrCl2) was purchased from Aldrich and used as received, Poly(methylaluminoxane), (MAO, Akzo Nobel, Amersfoort, the Netherlands, 10.3 wt % Al in toluene) was also used as received.

General Procedure:

Polymerizations were conducted by transferring a quantity of toluene through a sample cylinder containing cyclopentene (typically ~1 L total solution) to a jacketed 2 L zipperclave reactor. The system was vented, evacuated briefly (5 s) and ethylene was admitted to the reactor. The system was allowed to equilibrate at the set pressure and temperature. A small quantity of rac-En(Ind)2ZrCl2 (1–10 mg) was dissolved in dry toluene and injected with a syringe to the reactor following an injection of corresponding amount of MAO (2–8 ml, to keep the Al/Zr molar ratio ~2000). The polymerizations were allowed to proceed with ethylene fed on demand to maintain reactor pressure for 0.5 to 2 hrs, depending on the reaction rate, and were terminated by venting the reactor and discharging the contents into a 4 L Waring blender containing 1 L of methanol and 10 ml of 2,4-pentanedione (to remove aluminum residue from the polymer). The discharged material was vigorously agitated and filtered through a Buchner funnel. The polymer was dried in a vacuum oven at 60–80° C. In general 60 to 170 g of polymer was collected. Optionally, hydrogen (100–300 ml), which is a chain transfer agent, was used to control molecular weight of the copolymer. Hydrogen was added immediately prior to the addition of ethylene.

Procedure for Ethylene-4-Vinylcyclohexene-Cyclopentene Terpolymerization

Purification of the Reagents:

All reagents were purified as described above.

General Procedure:

Calculated quantities of Cyclopentene and 4-Vinyl-1-Cyclohexene were introduced to a jacketed 2 L zipperclave reactor, using a sample cylinder. Toluene was then transferred to make a total 1 L of the solution. The system was vented, evacuated briefly (5 s) and ethylene was admitted to the reactor. The system was allowed to equilibrate at the set pressure and temperature. A small quantity of rac-En(Ind)2ZrCl2 (2.5–5 mg) was dissolved in dry toluene and injected with a syringe to the reactor following an injection of corresponding amount of MAO, to keep the Al/Zr molar ratio ~2000). The polymerizations were allowed to proceed with ethylene fed on demand to maintain reactor pressure for 0.5 to 1.5 hrs, depending on the reaction rate, and were terminated by venting the reactor and discharging the contents into a 4 L Waring blender containing 1 L of methanol and 10 ml of 2,4-pentanedione (to remove aluminum residue from the polymer). The discharged material was vigorously agitated and filtered through a Buchner funnel. The polymer was dried in a vacuum oven at 60–80° C. In general 90 to 150 g of polymer was collected.

Melt flow index was measured using a CSI MFI-2 and 2.16 kg (I2) or 10 kg (I10) weights at 190° C. according to ASTM D1238. Density was estimated from a melt pressed thick film (~20 mil), measurments were conducted on an analytical balance using a density adapter with absolute ethanol as the liquid phase. Differential scanning calorimetry was conducted on a TA instruments DSC2920 at a heating rate of 10° C./min, the instrument was calibrated with a NIST indium standard. Glass transition temperature ($T_g$) was measured as tan delta on a TA instruments DMA2980 at a heating rate of 3° C./min and oscillating amplitude of 10 microns. $^{13}$C NMR analysis was done using a Bruker AX –400 MHz NMR spectrometer in benzene-$d_6$. The molecular weight distribution of the polymer was measured at 148° C. by gel permeation chromatograph (GPC, Waters 150C) using 1,2,4-trichlorobenzene as solvent. Clarity and haze of pressed films (10 mil) were go measured on a Gardner Haze-gard Plus meter.

TABLE 1

Ethylene/Cyclopentene Copolymers

| | Example number | | | | | | | | |
|---|---|---|---|---|---|---|---|---|---|
| | 1 | 2 | 3 | 4 | 5 | 6 | 7 | 8 | 9 |
| REACTANTS | | | | | | | | | |
| $C_2H_4$ pressure in reactor (psig) | 30 | 30 | 20 | 20 | 10 | 10 | 10 | 10 | 10 |
| Cyclopentene (mol/L) | 3.04 | 3.01 | 3.28 | 3.2 | 3.28 | 3 | 2.2 | 2.47 | 2.25 |
| Et(Ind)$_2$ZrCl$_2$ (mg) | 2.00 | | | 7.00 | 3.00 | 10.0 | 6.00 | 2.00 | 2.00 |
| Alternative Catalyst (mg) | | 5.00 | 10.0 | | | | | | |
| $H_2$ (ml) | | | | | | | | | 300 |
| REACTION CONDITIONS | | | | | | | | | |
| Reactor temperature (° C.) | 40 | 40 | 75 | 75 | 60 | 60 | 60 | 60 | 60 |
| Reaction time (min.) | 140 | 140 | 140 | 90 | 60 | 110 | 130 | 45 | 50 |
| POLYMER PRODUCT | | | | | | | | | |
| Amount recovered (g) | 47 | 75 | 35 | 70 | 60 | 67 | 75 | 110.5 | 121.5 |
| Melt flow index (dg/min, I$_2$) | Very low | Very low | 6.08 | 3.19 | 1.49 | 1.45 | 0.21 | 0.08 | 10.8 |
| I$_{10}$ (dg/min) | .001 | .002 | | 31.04 | 17.3 | 16.5 | 3.94 | 1.12 | 120 |
| I$_{10}$/I$_2$ | | | | 9.73 | 11.6 | 11.4 | 18.8 | 14 | 11.1 |
| Melting temp. (° C.) | 119 | 111 | 101 | 99.5 | 80.0 | 86.7 | 98.5 | 91.5 | 91.5 |
| T$_g$ (° C.) | | | | | –6.6 | –6.3 | 12.3 | | 4.58 |
| Cyclopentene content (mol %) | 1.9 | | 3.5 | | 8.8 | | | 6.9 | |
| M$_n$ (kg/mol) | 75.7 | 86.4 | 25.7 | 28.7 | 34.3 | 31 | 40.4 | 48.7 | 14.6 |
| M$_w$ (kg/mol) | 212 | 268 | 50.6 | 55.9 | 65.2 | 59 | 77.9 | 99.6 | 79.7 |
| Polydispersity | 2.8 | 3.1 | 2.0 | 2.0 | 1.9 | 1.9 | 1.9 | 2.0 | 3.4 |
| Density (g/cm$^3$) | .952 | .936 | | .929 | .919 | | .929 | .924 | .925 |
| OPTICAL PROPERTIES | | | | | | | | | |
| Haze (%) | | 22.3 | | 20.5 | 18.7 | 14.7 | 14.6 | — | 18.4 |

| | Example number | | | | | | | | |
|---|---|---|---|---|---|---|---|---|---|
| | 10 | 11 | 12 | 13 | 14 | 15 | 16 | 17 | 18 |
| REACTANTS | | | | | | | | | |
| $C_2H_4$ pressure in reactor (psig) | 10 | 10 | 10 | 10 | 10 | 10 | 10 | 4 | 10 |
| Cyclopentene (mol/L) | 1.99 | 2.13 | 1.34 | 3.32 | 3.62 | 4.5 | 6.38 | 7.85 | Neat |
| Et(Ind)$_2$ZrCl$_2$ (mg) | 2.00 | 2.00 | 1.50 | 2.00 | 2.00 | 2.00 | 4.00 | 3.00 | 4.00 |
| Alternative Catalyst (mg) | | | | | | | | | |
| $H_2$ (ml) | 300 | 100 | 200 | | | | | | |
| REACTION CONDITIONS | | | | | | | | | |
| Reactor temperature (° C.) | 60 | 60 | 60 | 60 | 50 | 50 | 45 | 40 | 35 |
| Reaction time (min.) | 40 | 30 | 35 | 40 | 40 | 120 | 40 | 120 | 60 |
| POLYMER PRODUCT | | | | | | | | | |
| Amount recovered (g) | 149 | 125 | 123 | 135 | 122 | 134 | 175 | 110 | 110 |
| Melt flow index (dg/min, I$_2$) | 5.3 | 0.97 | 12.8 | 6.3 | 0.61 | 2.45 | 0.7 | Very high | 11.5 |
| I$_{10}$ (dg/min) | 64.2 | 14.3 | | 67.6 | 8.4 | 26.4 | 9.5 | | |
| I$_{10}$/I$_2$ | 12.1 | 14.7 | | 10.7 | 13.8 | 10.8 | 13.6 | | |
| Melting temp. (° C.) | 93.6 | 97.9 | 106 | 68.9 | 67.8 | 61.6 | | Amorphous | |
| T$_g$ (° C.) | 3.6 | | | | –11 | –12 | | | –16 |
| Cyclopentene content (mol %) | 4.5 | | 2.4 | 11.2 | | 11.8 | 15.7 | | 24.1 |
| M$_n$ (kg/mol) | 15.7 | 30.5 | 19.8 | 25.5 | 37.5 | 34.6 | 42.5 | | 32.6 |
| M$_w$ (kg/mol) | 54.5 | 69.7 | 49 | 51 | 73.5 | 64.5 | 84.9 | | 60 |

TABLE 1-continued

Ethylene/Cyclopentene Copolymers

| | | | | | | | | |
|---|---|---|---|---|---|---|---|---|
| Polydispersity | 3.5 | 2.3 | 2.5 | 2.0 | 2.0 | 1.9 | 2.0 | 1.8 |
| Density (g/cm$^3$) | .925 | .928 | .93 | .918 | .918 | .916 | .917 | .919 |
| OPTICAL PROPERTIES | | | | | | | | |
| Haze (%) | 19.2 | 18.2 | | 20.2 | | 16.4 | 56.3 | 91 |

TABLE 2

Ethylene/Cyclopentene/4-Vinyl Cyclohexene Terpolymers

| | Example number | | | | | | | | | |
|---|---|---|---|---|---|---|---|---|---|---|
| | 19 | 20 | 21 | 22 | 23 | 24 | 25 | 26 | 27 | 28 |
| REACTANTS | | | | | | | | | | |
| $C_2H_4$ pressure in reactor (psig) | 10 | 10 | 10 | 10 | 10 | 10 | 10 | 10 | 10 | 10 |
| Cyclopentene (mol/L) | 2.09 | 1.04 | 3.09 | 2.09 | 1.47 | 1.03 | 2.57 | 2.4 | 2.51 | 2.49 |
| 4-Vinyl Cyclohexene (mol/L) | 2.08 | 2.96 | 2.23 | 2.22 | 2.25 | 2.15 | 2.17 | 2.9 | 1.52 | 1.03 |
| Et(Ind)$_2$ZrCl$_2$ (mg) | 7.00 | 2.50 | 5.00 | 5.00 | 5.00 | 2.50 | 5.00 | 5.00 | 5.00 | 5.00 |
| AL concentration (wt %) | .106 | .037 | .076 | .076 | .076 | .036 | .074 | .074 | .075 | .075 |
| REACTION CONDITIONS | | | | | | | | | | |
| Reactor temperature (° C.) | 60 | 60 | 60 | 50 | 60 | 60 | 50 | 50 | 50 | 50 |
| Reaction time (min.) | 135 | 30 | 110 | 130 | 25 | 30 | 90 | 50 | 90 | 30 |
| POLYMER PRODUCT | | | | | | | | | | |
| Amount recovered (g) | 101 | 122 | 175 | 94 | 144 | 126 | 107 | 139 | 117 | 112 |
| Melt flow index (dg/min, $I_2$) | 2.92 | 5.62 | High | 0.52 | 11.6 | 0.61 | 2.58 | 16.7 | 1.22 | 0.14 |
| $I_{10}$ (dg/min) | 28.1 | 55.8 | | 7.37 | | 5.01 | 26.5 | | 14.3 | 2.7 |
| $I_{10}/I_2$ | 9.6 | 9.9 | | 14.2 | | 15.6 | 10.3 | | 11.7 | 19.3 |
| Melting temp. (° C.) | 83.9 | 63.7 | Amor. | 76.4 | 61.9 | 81.3 | 64.5 | Amor. | 67.1 | 77.4 |
| $T_g$ (° C.) | | −9.8 | | | | | −9.8 | | | −8.9 |
| Cyclopentene content (mol %) | 3.6 | 3.3 | | 3.5 | 4.4 | 2.7 | 5 | 6 | 5.8 | 6 |
| 4-Vinylcyclohexene cont. (mol %) | 3.8 | 7.9 | | 4.4 | 7.7 | 5.9 | 4.8 | 8.2 | 3.9 | 2.8 |
| $M_n$ (kg/mol) | 33.5 | 30.5 | | 40.8 | 26.2 | 35 | 32.2 | 28.3 | 34.4 | 44.3 |
| $M_w$ (kg/mol) | 64.4 | 60.9 | | 84 | 56 | 74 | 64.9 | 53.8 | 72.7 | 93.6 |
| Polydispersity | 1.9 | 2 | | 2.1 | 2.1 | 2.1 | 2.0 | 1.9 | 2.1 | 2.1 |
| Density (g/cm$^3$) | .926 | .923 | | .924 | .925 | .921 | .926 | .922 | .923 | .919 |

COMPARATIVE EXAMPLE 29

An ethylene/4-vinylcyclohexene copolymer was polymerized having 6.5 mole percent 4-vinylcyclohexene.

COMPARATIVE EXAMPLE 30

An ethylene/methyl styrene/4-vinylcyclohexene terpolymer was polymerized having 1.2 mole percent 3(4)-methylstyrene and 3.4 mole percent 4-vinylcyclohexene.

COMPARATIVE EXAMPLE 31

A styrene-butadiene-styrene (SBS) triblock copolymer was obtained having 29 percent by weight styrene and sold under the tradename Vector™ 8508 by Dexco Polymers, Houston Tex.

The polymers of Examples 5, 10, 12, 14, 15, 20, 25 and 28 and Comparative Examples 29 and 30 were melt blended with 1000 ppm Ten-Cen™ cobalt (II) metal from the neodecanoate salt (CoNDA) (OMG Inc., Cleveland, Ohio), and 1000 ppm of 4,4'-dimethylbenzophenone (DMBP) (Lancaster Synthesis Inc.; Windham, N.H.) under nitrogen purge. Pressed plaques were formed and triggered with a combined UVA and UVC dose (1170 mJ/cm$^2$ and 800 mJ/cm$^2$ respectively) for about 90 seconds. Plaques having a total surface area of approximately 200 cm$^2$ (10 cm x 10 cm for a total of 100 cm$^2$ per side) were tested using a refrigerated headspace scavenging test as well as a parallel room temperature test. For the refrigerated headspace test the plaques were placed in barrier bags containing an atmosphere of 300 cm$^3$ of a blend of approximately 99% nitrogen and 1% oxygen. For the room temperature test the plaques were placed in barrier bags containing 300 cm$^3$ of air (20.6% oxygen in nitrogen). The percent oxygen content of the bags was analyzed periodically during the two to three week trial period using a MOCON™ LC700F oxygen analyzer (MOCON Corp.; Minneapolis, Minn.). The results are set forth in Table 3, below.

TABLE 3

Oxygen Scavenging Data
Room Temperature/Percent Oxygen

| Time in Days | Plaques formed from the Polymer of Example No.: | | | | | | | | Comp. 30 |
|---|---|---|---|---|---|---|---|---|---|
| | 5 | 10 | 12 | 14 | 15 | 20 | 25 | 28 | |
| | 20.6 | 20.6 | 20.6 | 20.6 | 20.6 | 20.6 | 20.6 | 20.6 | 20.6 |
| 1 | 16.3 | 19.1 | 20.4 | 19.9 | 19.8 | 15.2 | 14.2 | 14.1 | 18.7 |
| 4 | 9.6 | 14.5 | 17.9 | 18.9 | 18.9 | — | — | — | 12.9 |
| 6 | — | — | — | — | — | 7.9 | 6.6 | 6.2 | — |
| 7 | 5.5 | 10.7 | 14.6 | 16.2 | 16.4 | — | — | — | 9.7 |
| 10 | — | — | — | — | — | 4.3 | 5.5 | 4.0 | — |
| 14 | — | — | — | 7.2 | 8.4 | 3.3 | 2.3 | 2.1 | — |
| 21 | — | — | — | 1.3 | 1.9 | 2.1 | 1.4 | 1.2 | — |

TABLE 4

Oxygen Scavenging Data
Refrigerated/Percent Oxygen

| Time in Days | Plaques formed from the Polymer of Example No.: | | | | | | | | | |
|---|---|---|---|---|---|---|---|---|---|---|
| | 5 | 10 | 12 | 14 | 15 | 20 | 25 | 28 | Comp 29 | Comp 30 |
| 0 | 1.05 | 1.15 | 1.12 | 1.13 | 1.17 | 1.09 | 1.09 | 1.12 | 1.12 | 1.10 |
| 1 | 0.61 | 0.94 | 1.10 | 1.02 | 1.04 | 0.60 | 0.62 | 0.52 | 0.91 | 1.09 |
| 3 | — | — | — | — | — | 0.23 | 0.34 | 0.16 | — | — |
| 4 | 0.36 | 0.79 | 1.11 | 0.56 | 0.64 | — | — | — | 0.43 | 1.03 |
| 6 | — | — | — | — | — | — | — | — | — | — |
| 7 | 0.25 | 0.66 | 1.12 | 0.33 | 0.36 | 0.08 | 0.07 | 0.04 | 0.23 | 0.77 |
| 10 | — | — | — | — | — | — | — | — | — | — |
| 14 | — | — | — | 0.06 | 0.06 | 0.06 | 0.05 | 0.03 | 0.10 | — |
| 21 | — | — | — | 0.04 | 0.03 | — | — | — | 0.06 | 0.09 |

For the polymers of the present inventive polymeric component, the data set forth above translates into average and instantaneous rates having units of $cm^3$ $O_2/m^2/day$ as are set forth in Table 5, below. Unless otherwise noted, all average rates are reported at four days of scavenging.

TABLE 5

| | Refrigerated Rates | | Room Temperature Rates | |
|---|---|---|---|---|
| Example No. | Average Rate | Instantaneous Rate | Average Rate | Instantaneous Rate |
| 5 | 25.4 | 64 | 403 | 621 |
| 10 | 13.2 | 30 | 223 | 225 |
| 12 | 0 | 0 | 87.7 | 110 |
| 14 | 21.4 | 24 | 123 | 185 |
| 15 | 19.9 | 23 | 116 | 168 |
| 20 | 45.6 | 74 | 88 (6 days) | 832 |
| 25 | 39.8 | 71 | 350 (6 days) | 986 |
| 28 | 50.9 | 91 | 360 (6 days) | 1001 |

The polymeric component of this invention was compared to prior art polymers for tendency to produce organoleptically significant byproducts. The method used was gas chromatography with an olfactometry (sniff) port and simultaneous mass spectrometry detection (GC/O/MSD). Formulated scavenging films as described above were allowed to oxidize to a high (and similar) degree in an atmosphere of air sealed in a barrier pouch. Approximately 0.02 g samples of film were heated to 200° C. using a direct thermal desorption apparatus. The volatiles were cryo-trapped on the GC inlet and subsequently analyzed. Odor descriptions of individual volatile components eliciting an organoleptic response were identified by a person at the olfactometry port. The E-CP polymer chosen for this analysis was Example 14 from above. Comparison was made to a styrene-butadiene-styrene (SBS) triblock copolymer known in the prior art (Comparative Example 31) and the polymer of Comparative Example 29. Odor descriptions and retention times are tabulated below for these materials.

TABLE 6

Odor Descriptions and Retention Times

| SBS | | EVCH Comparative 29 | | ECP Example 14 | |
|---|---|---|---|---|---|
| Time | Descriptor | Time | Descriptor | Time | Descriptor |
| 2.6 | Almond | 2.6 | Almond | 2.4 | Aldehyde |
| 5.2 | Solvent | 3.3 | Acidic | 2.6 | Sweet |
| 5.5 | Foul | 5.3 | Green | 3.2 | Acidic |
| 6.4 | Very bad | 6.8 | Faint-bad | 4.4 | Harsh |
| 6.7 | Sweet | 7.1 | Alcohol | 4.8 | Solvent |
| 7.0 | Very foul | 8.4 | Aldehyde | 5.1 | Solvent |
| 7.3 | Very bad | 9.4 | Nutty | 7.1 | "ene" |
| 8.3 | Solvent | 9.6 | Nutty | 7.3 | Sweet |
| 9.4 | Spicy | 9.9 | Aldehyde | 7.9 | Faint |
| 9.6 | Nutty | 10.7 | Aldehyde | 8.4 | Faint |
| 9.7 | Spicy | 12.0 | Irritant | 9.4 | Burnt |
| 10.0 | Cucumber | 12.2 | Nutty | 9.5 | Nutty |
| 10.1 | Foul | | | 9.6 | Nutty |
| 10.3 | Solvent | | | 10.2 | Solvent |

It has been found with this type of screening test that components with retention times over about 10 minutes do not contribute significantly to organoleptic problems. Components most likely to cause significant organoleptic transfer are those with disagreeable odor descriptions that have retention times between about 3 and 8 minutes. Both ECP and EVCH offer some advantage in this respect relative to the prior art SBS material.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

We claim:

1. A composition suitable for scavenging oxygen comprising a mixture of:
   (a) at least one saturated copolymer of ethylene and a strained, cyclic alkylene having less than ten carbon atoms per ring; and
   (b) a transition metal catalyst, wherein the transition metal is selected from the first, second, or third transition series of the Periodic Table.

2. The composition of claim 1 wherein said mixture further comprises at least one photoinitiator compound.

3. The composition of claim 1 wherein the mixture further comprises at least one diluent polymer.

4. The composition of claim 2 wherein the mixture further comprises at least one diluent polymer.

5. The composition of claim 1 wherein the strained, cyclic alkylene having less than ten carbon atoms per ring is present in an amount of from about 1 to about 15 mole percent of said copolymer.

6. The composition of claim 1 wherein the copolymer has a polydispersity of at least about 1.5 to 5 and a melt flow index ratio ($I_{10}/I_2$) of at least about 7.

7. The composition of claim 1 wherein said copolymer of ethylene and strained, cyclic alkylene having less than ten carbon atoms per ring comprises a terpolymer of ethylene, cyclopentene, and one further comonomer.

8. The composition of claim 7 wherein said one further comonomer comprises a vinyl unsaturated alicyclic monomer represented by the formula:

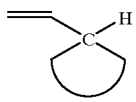

wherein

represents an unsubstituted or substituted $C_6$–$C_{12}$ non-aromatic ethylenic unsaturated alicyclic group.

9. The composition of claim 1 wherein the strained, cyclic alkylene having less than ten carbon atoms per ring comprises cyclopentene.

10. The composition of claim 1 wherein the strained, cyclic alkylene having less than ten carbon atoms per ring comprises cyclobutene.

11. The composition of claim 1 wherein the strained, cyclic alkylene having less than ten carbon atoms per ring comprises cycloheptene.

12. The composition of claim 1 wherein the strained, cyclic alkylene having less than ten carbon atoms per ring comprises cyclooctene.

13. The composition of claim 1 wherein the strained, cyclic alkylene having less than ten carbon atoms per ring comprises cyclononene.

14. A packaging article in the form of a rigid, semi-rigid, or film article having at least one layer exposed to an internal cavity of said packaging article, said at least one layer being formed from a blend comprising the composition of claim 1.

15. A packaging article in the form of a rigid, semi-rigid, or film article having at least one layer exposed to an internal cavity of said packaging article, said at least one layer being formed from a blend comprising the composition of claim 2.

16. A packaging article in the form of a rigid, semi-rigid, or film article having at least one layer exposed to an internal cavity of said packaging article, said at east one layer being formed from a blend comprising the composition of claim 3.

17. A packaging article in the form of a rigid, semi-rigid, or film article having at least ode layer exposed to an internal cavity of said packaging article, said at least one layer being formed from a blend comprising the composition of claim 4.

18. A packaging article in the form of a rigid, semi-rigid, or film article having at least one layer exposed to an internal cavity of said packaging article, said at least one layer being formed from a blend comprising the composition of claim 5.

19. A packaging article in the form of a rigid, semi-rigid, or film article having at least one layer exposed to an internal cavity of said packaging article, said at least one layer being formed from a blend comprising the composition of claim 6.

20. A packaging article in the form of a rigid, semi-rigid, or film article having at least one layer exposed to an internal cavity of said packaging article, said at least one layer being formed from a blend comprising the composition of claim 7.

21. A packaging article in the form of a rigid, semi-rigid, or film article having at least one layer exposed to an internal cavity of said packaging article, said at least one layer being formed from a blend comprising the composition of claim 8.

22. A packaging article in the form of a rigid, semi-rigid, or film article having at least one layer exposed to an internal cavity of said packaging article, said at least one layer being formed from a blend comprising the composition of claim 9.

23. A packaging article in the form of a gasket formed from a blend comprising the composition of claim 1.

24. A method of packaging an oxygen-sensitive product comprising:
(a) providing a film with at least one layer comprising a mixture of:
(i) at least one saturated copolymer of ethylene and strained, cyclic alkylene having less than ten carbon atoms per ring; and
(ii) a transition metal catalyst, wherein the transition metal is selected from the first, second, or third transition series of the Periodic Table;
(b) exposing the film to actinic radiation having a wavelength of between 200 and 750 nm or to electron beam radiation of at least about 2 kilo Gray; and
(c) placing the oxygen-sensitive product inside a container made from the film.

25. The method of claim 24 wherein said mixture further comprises at least one photoinitiator compound.

26. The method of claim 24 wherein said mixture further comprises at least one diluent polymer.

* * * * *